(12) United States Patent
Cho et al.

(10) Patent No.: US 9,116,006 B2
(45) Date of Patent: Aug. 25, 2015

(54) APPARATUS AND METHOD FOR DETERMINING INDOOR COLLECTION POINTS AND COLLECTING HETEROGENEOUS INFRASTRUCTURE MEASUREMENT INFORMATION

(71) Applicant: Electronics and Telecommunications Research Institute, Daejeon (KR)

(72) Inventors: Young-Su Cho, Seoul (KR); Myung-In Ji, Daejeon (KR); Sang-Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 284 days.

(21) Appl. No.: 13/755,864

(22) Filed: Jan. 31, 2013

(65) Prior Publication Data

US 2013/0197799 A1  Aug. 1, 2013

(30) Foreign Application Priority Data

Feb. 1, 2012 (KR) .......................... 10-2012-0010240
Jul. 23, 2012 (KR) .......................... 10-2012-0079960

(51) Int. Cl.
  *G08B 21/00* (2006.01)
  *G01C 21/34* (2006.01)
  *G01S 5/02* (2010.01)

(52) U.S. Cl.
  CPC ............ *G01C 21/3407* (2013.01); *G01S 5/0242* (2013.01)

(58) Field of Classification Search
  CPC ............................ G06K 7/10366; G06Q 10/06
  USPC ........................................................ 701/430
  See application file for complete search history.

(56) References Cited

U.S. PATENT DOCUMENTS

| 2006/0226970 A1* | 10/2006 | Saga et al. ................... 340/506 |
| 2007/0001904 A1* | 1/2007 | Mendelson .................. 342/450 |
| 2009/0043502 A1* | 2/2009 | Shaffer et al. ................ 701/213 |
| 2009/0121873 A1* | 5/2009 | Park, II ..................... 340/572.1 |
| 2010/0039929 A1* | 2/2010 | Cho et al. ...................... 370/216 |
| 2011/0018732 A1* | 1/2011 | Cho et al. ................. 340/825.49 |

FOREIGN PATENT DOCUMENTS

| KR | 10-2011-0051571 | 5/2011 |
| WO | 2011/019125 A1 | 2/2011 |
| WO | 2011/070551 A1 | 6/2011 |

* cited by examiner

*Primary Examiner* — Mark Rushing
(74) *Attorney, Agent, or Firm* — Nelson Mullins Riley & Scarborough LLP; Anthony A. Laurentano, Esq.; Lewis Lee, Esq.

(57) ABSTRACT

Disclosed herein is an apparatus and method for determining indoor collection points and collecting heterogeneous infrastructure measurement information. The apparatus includes a sensor module unit for sensing a motion and a location. An indoor map DB includes attribute information of an indoor space and an indoor map. A collection route generation unit generates a collection route on the indoor map depending on collection conditions. A collection point determination unit determines a collection point from which the heterogeneous infrastructure measurement information is to be collected on the collection route while moving, based on information of the sensor module unit and the indoor map DB. A heterogeneous infrastructure measurement information collection unit collects heterogeneous infrastructure measurement information from the collection point. An information combination unit generates results of collection by combining the collection point with the heterogeneous infrastructure measurement information at the collection point.

19 Claims, 7 Drawing Sheets

APPARATUS AND METHOD FOR DETERMINING INDOOR COLLECTION POINTS AND COLLECTING HETEROGENEOUS INFRASTRUCTURE MEASUREMENT INFORMATION

CROSS REFERENCE TO RELATED APPLICATIONS

This application claims the benefit of Korean Patent Application Nos. 10-2012-0010240 filed on Feb. 1, 2012 and 10-2012-0079960 filed on Jul. 23, 2012, which are hereby incorporated by reference in their entirety into this application.

BACKGROUND OF THE INVENTION

1. Technical Field

The present invention relates generally to an apparatus and method for determining indoor collection points and collecting heterogeneous infrastructure measurement information and, more particularly, to an apparatus and method in which a user terminal automatically generates collection points, from which wireless communication infrastructure measurement information is to be collected, in an indoor area by using information measured by sensors mounted inside and outside the terminal and indoor space information without requiring a user's input, and in which the user terminal collects heterogeneous infrastructure measurement information from the corresponding collection points.

2. Description of the Related Art

Global Positioning System (GPS)-based positioning technology is able to achieve location accuracy having an error margin of several m to several tens of m in any outdoor area across the earth by utilizing GPS satellites. Such GPS-based positioning technology can provide the location information of a user terminal equipped with a GPS receiver in a world coordinate system (for example, latitude, longitude, altitude, etc.). In the future, with the appearance of additional broadband satellite navigation systems, such as Galileo of Europe and Global Navigation Satellite System (GLONASS) of Russia, it is predicted that location availability and accuracy will be improved in an outdoor space.

However, when the GPS-based positioning technology is used in an indoor area and a congested metropolitan area, weak signals may be received or multi-path errors may be increased due to an environment being enclosed by buildings. Due thereto, the determination of the location may be impossible, or location accuracy may be deteriorated. Further, a problem also arises in that a Time To First Fix (TTFF) caused by a decrease in the number of visible satellites is increased.

Mobile communication base station-based positioning technology enables such a TTFF to be shorter than that of GPS. However, base station cell-based location determination is disadvantageous in that it generally has location accuracy lower than that of the GPS even if it is influenced by the arrangement of a base station.

Meanwhile, Wi-Fi-based positioning technology can provide precise location information having an error margin of about several m using signal intensities received from Wi-Fi Access Points (APs) in an area in which GPS signals are not received, the indoor area of a large building having a high GPS location error, or a congested metropolitan area. Recently, a service available area has been extended to a great city area using Wardriving (or AP mapping) technology based on Skyhook Wireless of the United States. However, Wardriving (or AP mapping) technology using vehicles is problematic in that high cost is required to initially construct the location database (DB) of Wi-Fi APs. Further, since collection is mainly performed in an outdoor area, collection points are implemented using GPS location information. Due thereto, there is a problem in that in an indoor area where it is difficult to receive GPS signals, it is impossible to obtain collection points.

For technology for obtaining collection points in the indoor area, a scheme for directly selecting collection points or areas (a room, a passage, the surrounding area of interest, etc.) indicated on an indoor map, and a scheme for allowing a user to enter text have been used. As an example thereof, Korean Patent Application Publication No. 2011-0051571 (entitled "Collection apparatus and method of generating expected collection points thereof") is configured such that in a wireless Local Area Network (LAN)-based indoor positioning system, the convenience of collecting the measurement information of wireless Access Points (APs) from more accurate collection points can be promoted. For this, the technology in Korean Patent Application Publication No. 2011-0051571 selects an indoor map corresponding to the geographical information of an indoor area desired to be investigated, sets an expected collection point in consideration of the location accuracy of a required terminal, inputs the expected collection point to the indoor map, scans APs based on the expected collection point, and transmits the measurement information of acquired APs to a location server. According to Korean Patent Application Publication No. 2011-0051571, there is the inconvenience of causing a user to personally input an expected collection point. Further, there is a problem in that the user must previously understand the spatial distribution of a collection target area using the indoor map, and the expected collection point is arbitrarily determined depending on the opinion of the user. Furthermore, since the expected collection point is subjectively and arbitrarily determined by a collector (the user), an error in the determination of a collection point increases. Together with this, such technologies cause inconvenience because the user must continuously input collection areas, and increase the collection time. In other words, the conventional scheme was a passive scheme in which the collector personally selected an expected collection point and collected measurement information. As a result, with an increase in the collection time required by the collector, an increase in cost is caused.

SUMMARY OF THE INVENTION

Accordingly, the present invention has been made keeping in mind the above problems occurring in the prior art, and an object of the present invention is to provide an apparatus and method that automatically generate collection points in an indoor area and collect heterogeneous infrastructure measurement information from the corresponding collection points.

In accordance with an aspect of the present invention to accomplish the above object, there is provided an apparatus for determining indoor collection points and collecting heterogeneous infrastructure measurement information, including a sensor module unit for sensing a motion and a location; an indoor map database (DB) including attribute information of an indoor space and an indoor map; a collection route generation unit for generating a collection route on the indoor map depending on collection conditions; a collection point determination unit for determining a collection point from which the heterogeneous infrastructure measurement information is to be collected on the collection route while moving, based on information of the sensor module unit and the indoor map DB; a heterogeneous infrastructure measurement information collection unit for collecting heterogeneous infrastructure measurement information from the collection point; and an information combination unit for generating results of collection by combining the collection point with the heterogeneous infrastructure measurement information at the collection point.

Preferably, the sensor module unit may include one or more of an acceleration sensor, a geomagnetic sensor, a gym sensor, an altimeter, and a camera.

Preferably, the collection route may include a collection start point and a collection end point, and further include an intermediate point.

Preferably, the heterogeneous infrastructure measurement information may include measurement information for positioning.

Preferably, the collection point determination unit may determine a movement direction and a variation in the collection point of the apparatus based on sensing information output from the sensor module unit, and determine a collection point subsequent to a current collection point mapped to the collection route using the movement direction and the point variation.

Preferably, the collection point determination unit may further include a route tracking unit for checking whether the determined collection point has correctly tracked the collection route. In this case, the collection point determination unit may re-set the collection route if the determined collection point has deviated from the collection route.

Preferably, the apparatus may further include an information transmission unit for transmitting the results of the collection obtained by the information combination unit to a server. Further, the apparatus may further include a combined information database for storing the results of the collection obtained by the information combination unit.

In accordance with another aspect of the present invention to accomplish the above object, there is provided a method of determining indoor collection points and collecting heterogeneous infrastructure measurement information, including generating, by a collection route generation unit, a collection route on an indoor map of a target area in which heterogeneous infrastructure measurement information is to be collected, depending on collection collections; determining, by a collection point determination unit, a collection point from which the heterogeneous infrastructure measurement information is to be collected on the collection route while moving; collecting, by a heterogeneous infrastructure measurement information collection unit, heterogeneous infrastructure measurement information from the collection point; and generating, by an information combination unit, results of collection by combining the collection point with the heterogeneous infrastructure measurement information at the collection point.

Preferably, determining the collection point may include determining a movement direction and a variation in a collection point based on sensing information output from a sensor module unit; and determining a collection point subsequent to a current collection point mapped to the collection route using the movement direction and the collection point variation.

Preferably, the method may further include checking, by the collection point determination unit, whether the determined collection point has correctly tracked the collection route. In this case, checking whether the determined collection point has correctly tracked the collection route may be configured to re-set the collection route if the determined collection point has deviated from the collection route.

Preferably, the method may further include storing, by the information combination unit, the results of the collection in a combined information database.

Preferably, the method may further include transmitting, by an information transmission unit, the results of the collection to a server.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
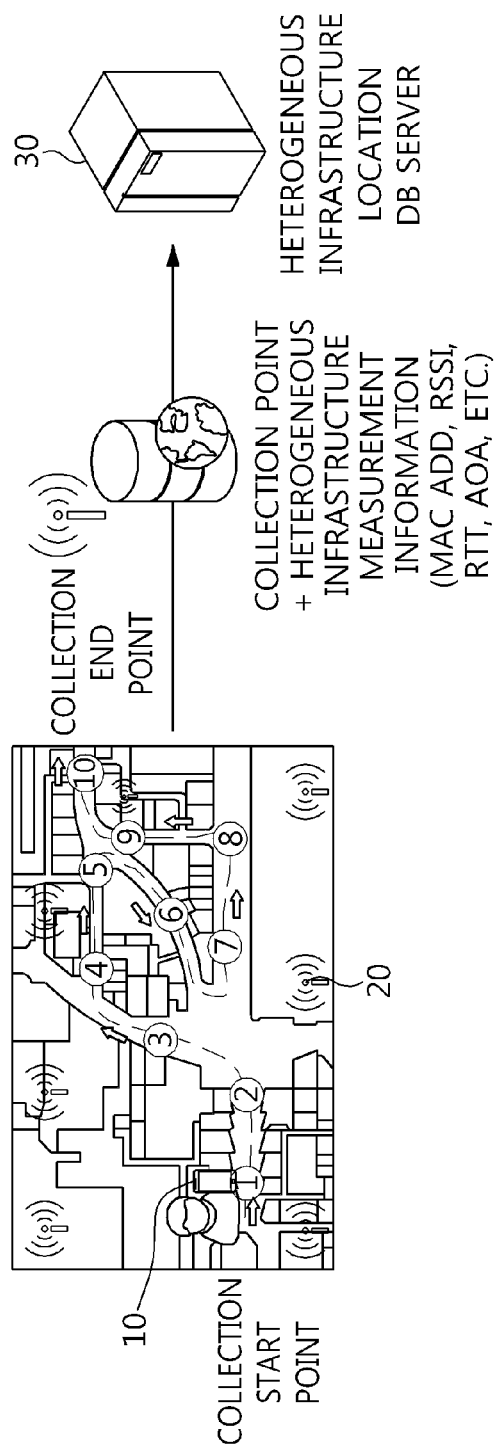
FIG. 1 is a diagram showing an example of a system to which the present invention is applied.

Hereinafter, an apparatus and method for determining indoor collection points and collecting heterogeneous infrastructure measurement information according to embodiments of the present invention will be described in detail with reference to the attached drawings. The terms and words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

FIG. 1 is a diagram showing an example of a system to which the present invention is applied.

A system to which the present invention is applied includes a collection terminal 10, wireless communication heterogeneous infrastructures 20, and a heterogeneous infrastructure location database (DB) server 30. An apparatus for determining indoor collection points and collecting heterogeneous infrastructure measurement information according to the present invention may be understood to be the collection terminal 10.

The collection terminal 10 includes a sensor module for providing information required to determine collection points and directions, and a heterogeneous infrastructure network interface card for collecting heterogeneous infrastructure measurement information. Preferably, the collection terminal 10 may be understood to be a mobile communication terminal or a computing device. For example, the latest smart phones include various types of sensor devices, such as an accelerometer, a gyro sensor, a geomagnetic sensor, an altimeter, and a camera. Further, the latest smart phones include, as communication modules, a mobile communication module (for example, a module for Code Division Multiple Access (CDMA), Wideband CDMA (WCDMA), Long Term Evolution (LTE), WiBro, Femtocell, or the like), and a short-range communication module (for example, a module for Wireless Fidelity (Wi-Fi), Radio Frequency Identification (RFID), Near Field Communication (NFC), Bluetooth, or the like). Accordingly, one of the latest smart phones can be used as the collection terminal 10. Furthermore, a tablet Personal Computer (PC), a Netbook, or a notebook, internally or externally equipped with a required sensor and a required communication module, can also be used as the collection terminal 10.

The collection terminal 10 stores an indoor map and network information (nodes and links). The indoor map and network information (nodes and links) are used to visualize indoor space information and generate the route of the collection terminal 10, for the purpose of efficiently collecting the indoor space information. Here, the indoor map includes all vector or image file-type maps representing an indoor space, such as a Computer Aided Design (CAD) drawing and a guide map. Network information includes all algorithms and network models required to generate a route for connecting a collection start point to a collection end point by classifying the attribute information of the indoor space (for example, passages, rooms, entrances, elevators, stairs, windows, desks, chairs, etc.) into nodes and connecting the nodes through links.

The internal configuration of the collection terminal 10 will be described in detail with reference to FIG. 2 which will be described later.

The wireless communication heterogeneous infrastructures 20 include all types of wireless communication infrastructures around a collection environment enabling transmission and reception to and from the communication module of the collection terminal 10. For example, the wireless communication heterogeneous infrastructures 20 may include a mobile communication module (for example, a module for CDMA, WCDMA, LTE, WiBro, Femtocell, or the like), a short-range communication module (for example, a module for Wi-Fi, RFID, NFC, Bluetooth, or the like), etc.

The heterogeneous infrastructure location DB server 30 receives the collection points and the heterogeneous infrastructure measurement information determined and collected by the collection terminal 10. The heterogeneous infrastructure location DB server 30 estimates the installation locations of the heterogeneous infrastructures based on the received collection points and heterogeneous infrastructure measurement information, and arranges the estimated installation locations into a database (DB). The heterogeneous infrastructure location DB server 30 may be understood to be a computing device.

Figure 2:
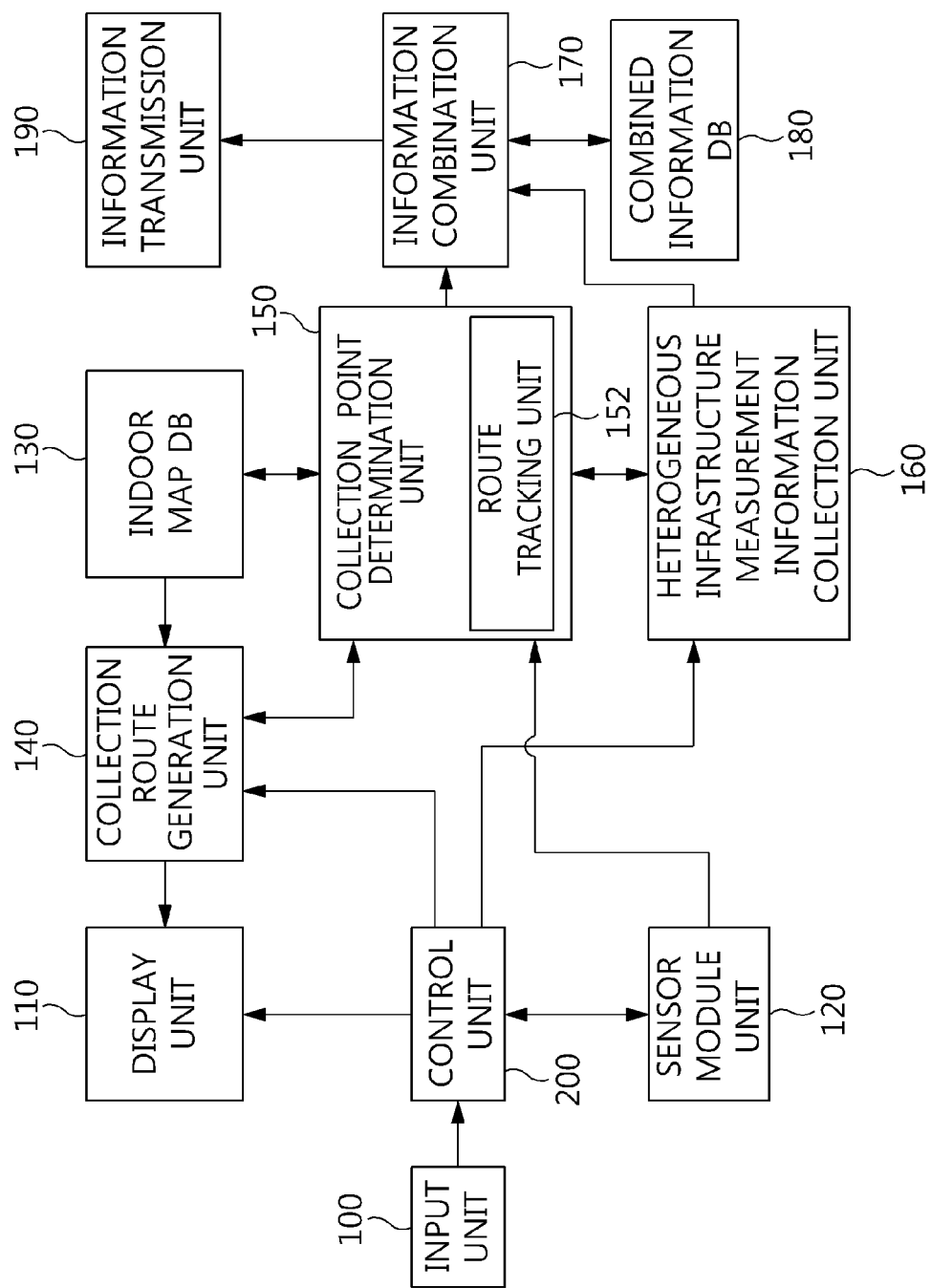
FIG. 2 is a block diagram showing an apparatus for determining indoor collection points and collecting heterogeneous infrastructure measurement information according to an embodiment of the present invention.

FIG. 2 is a block diagram showing an apparatus for determining indoor collection points and collecting heterogeneous infrastructure measurement information according to an embodiment of the present invention.

The apparatus of FIG. 2 (that is, the collection terminal 10) includes an input unit 100, a display unit 110, a sensor module unit 120, an indoor map DB 130, a collection route generation unit 140, a collection point determination unit 150, a heterogeneous infrastructure measurement information collection unit 160, an information combination unit 170, a combined information DB 180, an information transmission unit 190, and a control unit 200.

The input unit 100 includes a key input means required to select an indoor map of a target area in which the heterogeneous infrastructure measurement information is to be collected. The indoor map may be either previously stored in the collection terminal 10 or remotely received via a map server (not shown). Meanwhile, the input unit 100 includes the key input means for inputting collection conditions (for example, a collection start point, an intermediate point, a collection end point, a scan period, etc.). Here, the collection start point and the collection end point are necessarily required to determine the start point and end point of the collection route. The scan period denotes a period at which the collection terminal 10 scans surrounding heterogeneous infrastructure measurement information. The intermediate point may be input depending on the selection of a collector. A collection start instruction is activated by manipulating a separate button or the like provided on the input unit 100. Of course, the collection start instruction may also be automatically activated, for example, if the input of collection conditions has been completed.

The display unit 110 displays the indoor map of a target area selected by the collector on a screen. On the indoor map displayed on the display unit 110, the collection start point, the intermediate point, the collection end point, etc. are displayed, as shown in FIG. 1. Further, as the collection route is generated and the collection points are determined, the display unit 110 may display the collection route (a sequential flow indicated by ① to ⑩) and the collection points (① to ⑩), as shown in FIG. 1. Meanwhile, as shown in FIG. 1, the display unit 110 may display the locations of wireless communication heterogeneous infrastructures around the collection route.

The sensor module unit 120 senses the motion and the location of the collection terminal 10. In more detail, the sensor module unit 120 includes all sensors used to measure the walking characteristics of a collector who is moving with the collection terminal 10 in hand and determine the location of the collection terminal 10. For example, the sensor module unit 120 includes one or more of sensors including an acceleration sensor, a gym sensor, a geomagnetic sensor, an altimeter, and a camera. In this way, the sensor module unit 120 includes one or more sensors, thus providing information required to determine collection points and directions.

The indoor map DB 130 includes indoor maps or the like, including attribute information and image information required to visualize the indoor maps and generate routes. Here, the meaning of the attribute information and each indoor map may be understood to be identical to that of the attribute information and the indoor map of the above-described indoor space.

The collection route generation unit 140 generates a collection route on an indoor map of the corresponding collection target area, based on the collection start point, the intermediate point, and the collection end point among the collection conditions. That is, the collection route generation unit 140 generates a collection route based on the network model of the indoor map using the collection conditions (the collection start point, the intermediate point, and the collection end point). The collection route is a route connecting the collection start point to the collection end point. The collection route generation unit 140 displays the generated collection route on the display unit 110, as shown in FIG. 1.

The collection point determination unit 150 determines a collection point from which heterogeneous infrastructure measurement information is to be collected on the collection route while the collector is moving, based on the information of the sensor module unit 120 and the indoor map DB 130. In other words, when the collector is moving to collect information, the collection point determination unit 150 processes sensing information output from the sensor module unit 120, and then measures a stride, the number of steps, absolute or relative orientation information, etc. The collection point determination unit 150 determines the movement direction of the collection terminal 10 and a variation in the collection point of the collection terminal 10, based on the measured information. Thereafter, the collection point determination unit 150 determines a collection point subsequent to the current collection point mapped to the network information (nodes and links) of the indoor map. That is, the collection point determination unit 150 determines the subsequent collection point mapped to the network information (nodes and links) of the indoor map by applying the calculated location variation and direction of the collection terminal 10 to the current collection point mapped to the network information (nodes and links) of the indoor map. The collection point determined by the collection point determination unit 150 may be displayed on the display unit 110.

Meanwhile, the collection point determination unit 150 may further include a route tracking unit 152 for checking whether the determined collection point has correctly tracked the collection route. In this case, the collection point determination unit 150 re-sets the collection route if the determined collection point has deviated from the collection route.

The heterogeneous infrastructure measurement information collection unit 160 includes a heterogeneous infrastructure Network Interface Card (MC) module. The heterogeneous infrastructure MC module scans heterogeneous infrastructure measurement information via network connection to the surrounding wireless communication heterogeneous infrastructures 20 depending on the scan period (this is one of the collection conditions) set by the collector. Here, the heterogeneous infrastructure MC module refers to all communication modules (including adapters and drivers) that can be provided by the collection terminal 10. In order to obtain the measurement information of a maximum number of wireless communication heterogeneous infrastructures 20 at the collection procedure, an instruction for activating deactivated heterogeneous infrastructure MC modules may be issued. Heterogeneous infrastructure measurement information includes positioning measurement information obtained via communication between individual heterogeneous infrastructures and the collection terminal 10. For example, the positioning measurement information includes an infrastructure Identification (ID) (for example, a Base Station Identifier (BSID) or a Media Access Control (MAC) Address), Received Signal Strength Indicator (RSSI), Round Trip Time (RTT), Angle Of Arrival (AoA), etc. Meanwhile, the scan period may denote information about an interval time at which heterogeneous infrastructure measurement information is scanned. For example, when the scan period is set to 1 second, the heterogeneous infrastructure MC module is operated at regular intervals of 1 second to scan surrounding heterogeneous infrastructure measurement information.

In this way, the heterogeneous infrastructure measurement information collection unit 160 collects heterogeneous infrastructure measurement information via the heterogeneous infrastructure NIC module included therein.

The information combination unit 170 generates the results of collection (that is, a set of combined information) by combining the collection points, determined by the collection point determination unit 150, with the heterogeneous infrastructure measurement information at the collection points.

The combined information DB 180 stores the results of the collection obtained by the information combination unit 170.

The combined information DB 180 includes at least collection times, collection points, heterogeneous infrastructure measurement information at the collection points, etc. as the output of collection results.

The information transmission unit 190 transmits the results of collection obtained by the information combination unit 170 to the server 30 for performing calculation on the data of the heterogeneous infrastructure location DB.

The control unit 200 controls the overall operation of the apparatus.

Figure 3A:
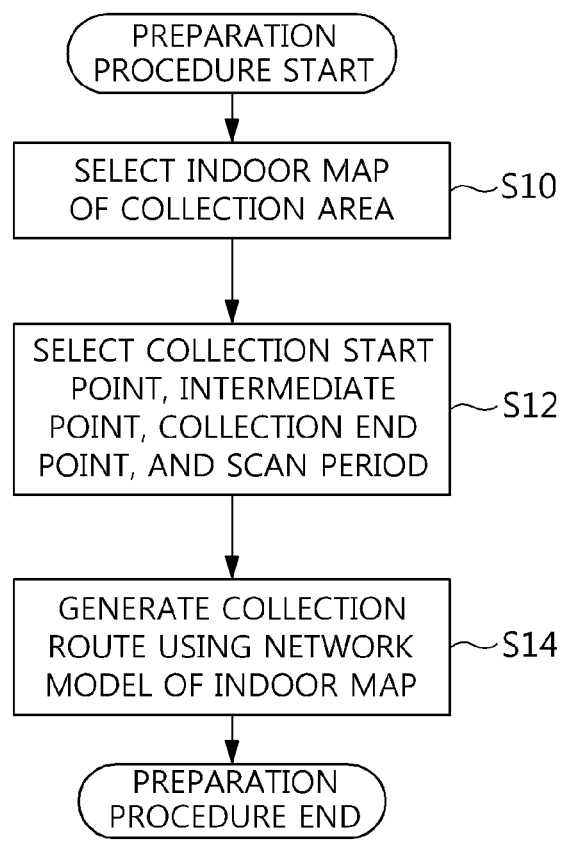
FIGS. 3A to 3C are flowcharts showing a method of determining indoor collection points and collecting heterogeneous infrastructure measurement information according to an embodiment of the present invention.
Figure 3B:
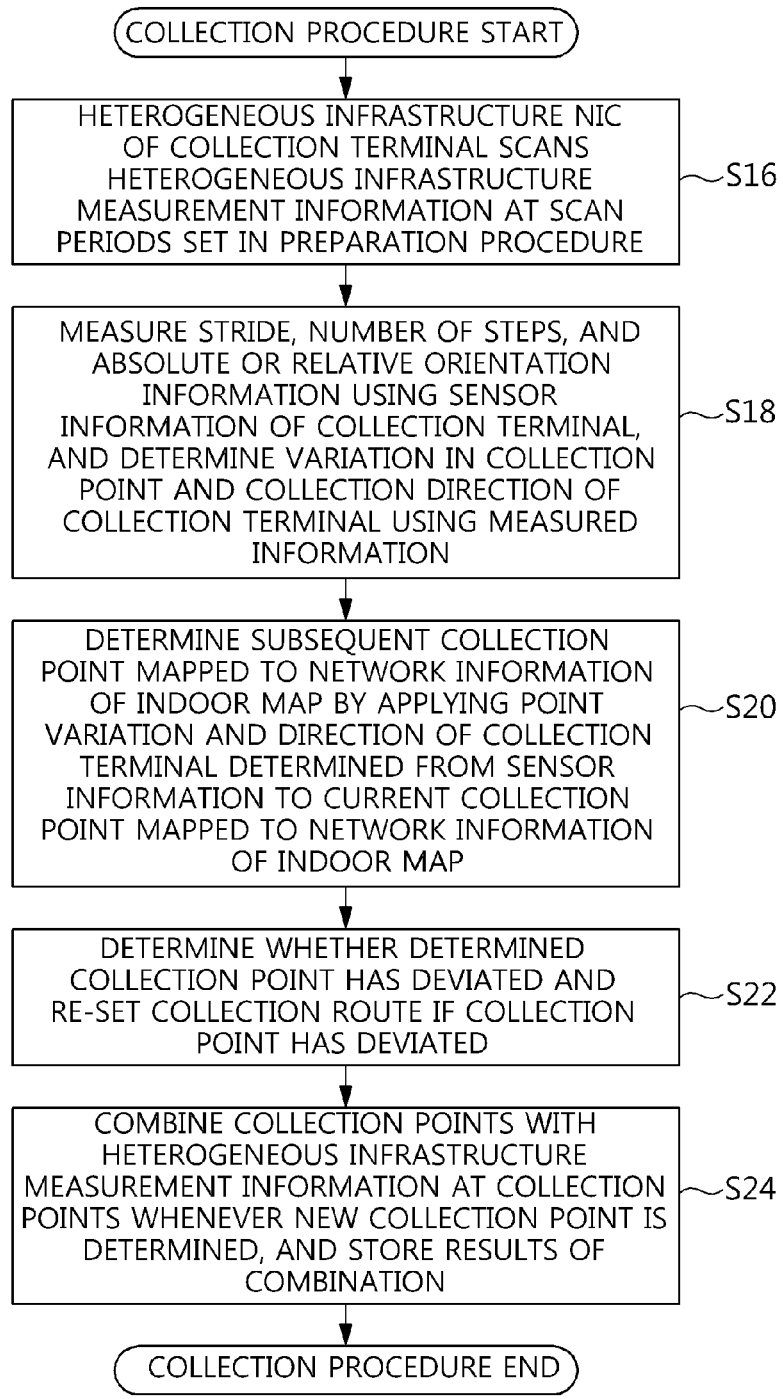
Figure 3C:
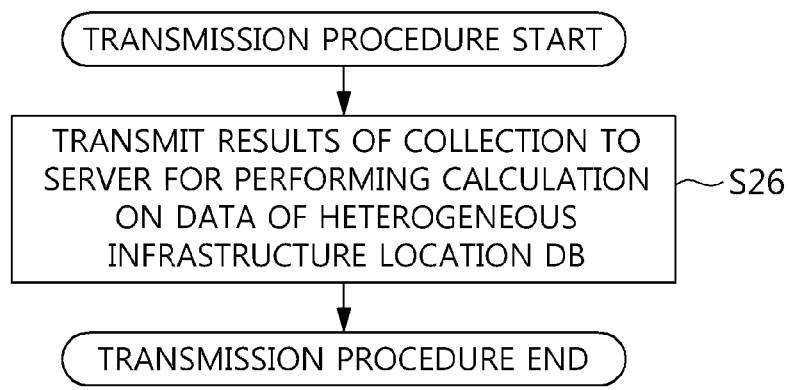

FIGS. 3A to 3C are flowcharts showing a method of determining indoor collection points and collecting heterogeneous infrastructure measurement information according to an embodiment of the present invention.

The present method can be mainly divided into a preparation procedure (see FIG. 3A), a collection procedure (see FIG. 3B), and a transmission procedure (see FIG. 3C).

The preparation procedure is described first. After a collector has moved to a target area in which heterogeneous infrastructure measurement information is to be collected, he or she loads an indoor map of the target area at step S10. This operation is performed by the input unit 100. The loaded indoor map is displayed on the display unit 110.

After loading the indoor map, the collector sets a collection start point, an intermediate point, a collection end point, a scan period, etc. by manipulating the input unit 100 at step S12. The setting of the collection start or end point can be performed by clicking the corresponding point on the indoor map or by searching for a Point Of Interest (POI) and finding the corresponding point. The scan period can be selected by the collector within the range of a minimum scan period that can be provided by the collection terminal 10.

After the setting has been completed, the collection route generation unit 140 generates a collection route using the network model of the indoor map at step S14. The generated collection route can be visualized on the display unit 110 of the collection terminal 10. Meanwhile, the collection route generation unit 140 can execute a generation algorithm by incorporating restrictive conditions (a restricted area or the like) into the generation of the collection route.

Below, the collection procedure is described. The collection procedure is configured to initiate collection based on the collection route generated in the preparation procedure. When a collection start instruction is issued, the heterogeneous infrastructure measurement information collection unit 160 scans surrounding heterogeneous infrastructure measurement information at preset scan periods and stores the results of scanning in internal memory (not shown) at step S16.

Then, when the collector moves for collection, the collection point determination unit 150 processes the information measured by the sensor module unit 12 and then measures a stride, the number of steps, and absolute or relative orientation information. Thereafter, the collection point determination unit 150 determines a variation in the collection point and the collection direction of the collection terminal 10 from the measured information at step S18.

Then, the collection point determination unit 150 determines a subsequent point mapped to the network information (nodes and links) of the indoor map by applying the determined point variation and direction of the collection terminal 10 to the current point mapped to the network information (nodes and links) of the indoor map at step S20.

Further, the collection point determination unit 150 determines whether the determined collection point has deviated from the collection route, and re-sets the collection route if it is determined that the collection point has deviated from the collection route at step S22. A detailed procedure of determining whether the collection point has deviated from the collection route and re-setting the collection route will be described with reference to FIGS. 4 and 5.

If it is determined that the collection point tracks a correct collection route by determining whether the collection point has deviated from the collection route, the collection point determination unit 150 continuously determines a subsequent collection point. Further, the information combination unit 170 combines the collection points determined by the collection point determination unit 150 with the heterogeneous infrastructure measurement information at the collection points, collected by the heterogeneous infrastructure measurement information collection unit 160, and stores the results of the combination in the combined information DB 180 at step S24.

Finally, the transmission procedure will be described. In the transmission procedure, the information transmission unit 190 transmits a set of combined information stored as the results of the collection procedure (collection points+heterogeneous infrastructure measurement information) to the server 30 for performing calculation on the data of the heterogeneous infrastructure location DB at step S26. Such transmission can be performed in real time at the same time that collection is performed, and the stored collection results can also be transmitted at a specific time in the form of a file.

Figure 4:
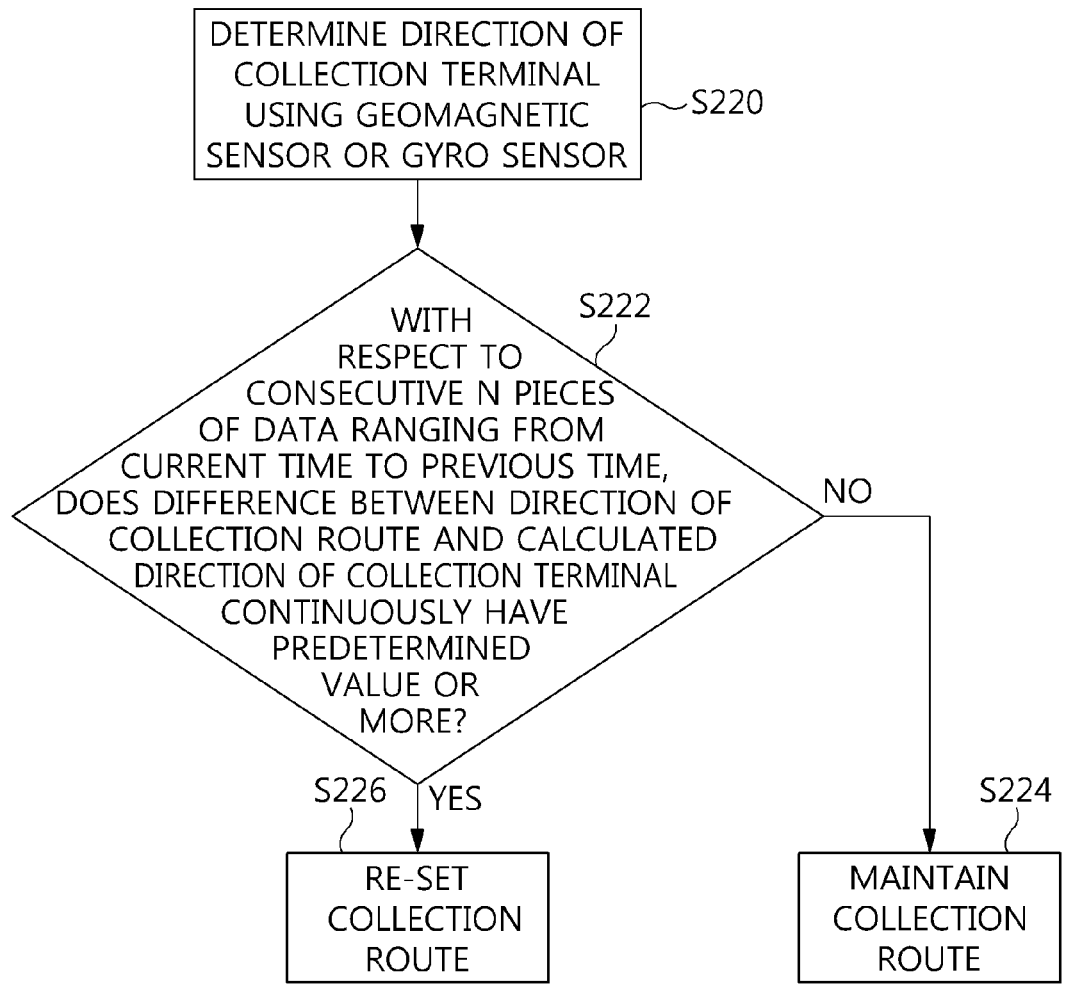
FIG. 4 is a flowchart showing in detail an example of the procedure of determining whether a collection point has deviated from a collection route and re-setting the collection route in FIG. 3.

FIG. 4 is a flowchart showing in detail an example of the procedure of determining whether a collection point has deviated from the collection route and re-setting the collection route in FIG. 3.

FIG. 4 assumes a case where the sensor module unit 120 of the collection terminal 10 determines the direction of the collection terminal 10 using a geomagnetic sensor or a gym sensor at step S220.

Then, it is determined whether, with respect to consecutive N pieces of data ranging from a current time to a previous time, the direction of the collection route and the calculated direction of the collection terminal 10 continuously have a difference of a predetermined value or more at step S222. A criterion (a predetermined value) required to determine the number of pieces of data (N) used and determine that the corresponding directions are different directions can be stochastically or heuristically determined using simulations or tests.

If, with respect to the consecutive N pieces of data ranging from the current time to the previous time, the difference between the directions of the collection route and the collection terminal 10 is maintained at less than the predetermined value ("No" at step S222), it is determined that the collection terminal 10 desirably tracks the collection route, and the collection route is maintained without change at step S224.

In contrast, if, with respect to the consecutive N pieces of data ranging from the current time to the previous time, the difference between the directions of the collection route and the collection terminal 10 is continuously equal to or greater than the predetermined value ("Yes" at step S222), it is determined that the collection terminal 10 is located on another route, and then the collection route is re-set to a collection route most approximate to the current location and direction of the collection terminal 10 at step S226. Upon re-setting the collection route, it must be re-set in consideration of all points ranging from the current revised location to the collection end point.

Figure 5:
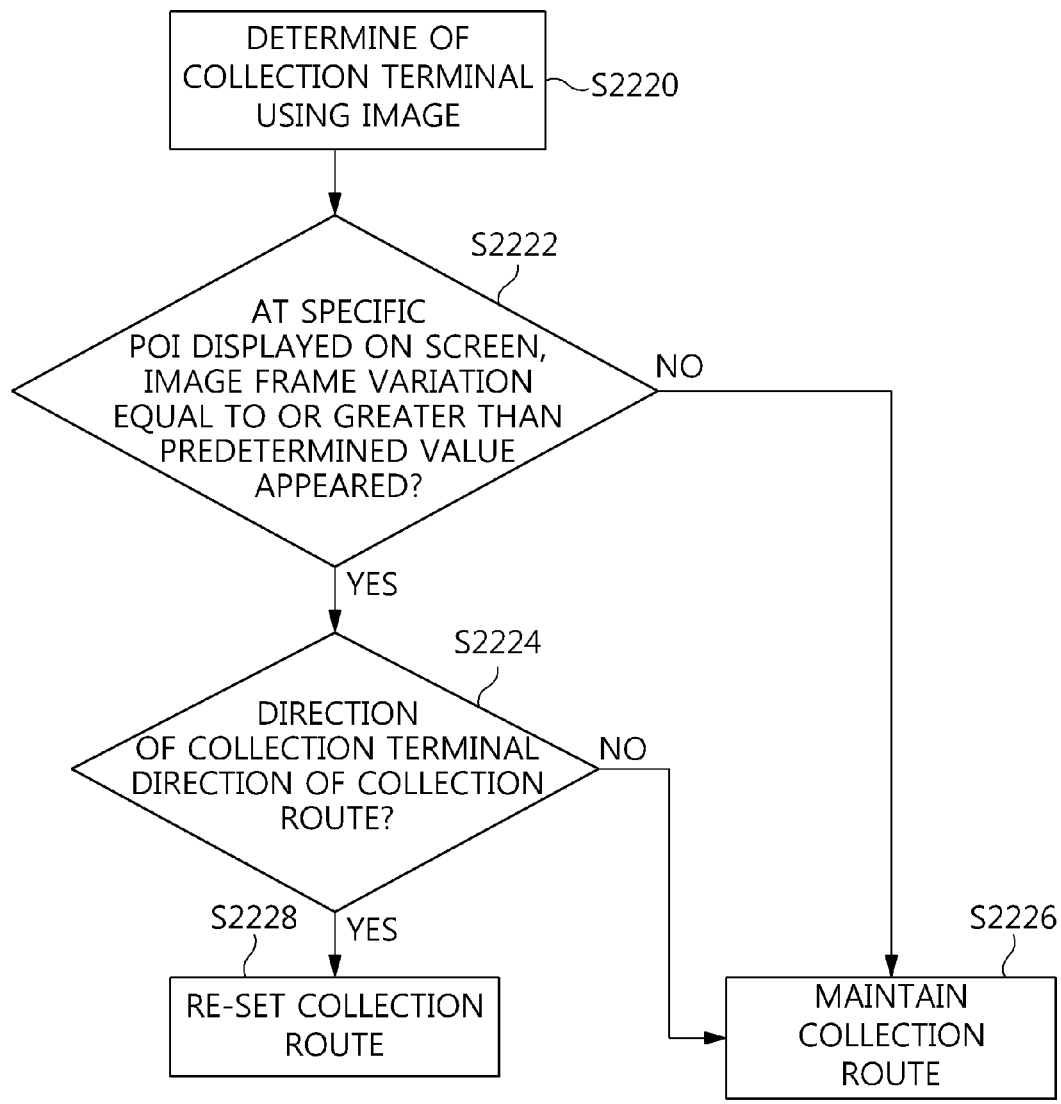
FIG. 5 is a flowchart showing in detail another example of the procedure of determining whether a collection point has deviated from a collection route and re-setting the collection route in FIG. 3.

FIG. 5 is a flowchart showing in detail another example of the procedure of determining whether a collection point has deviated from the collection route and re-setting the collection route in FIG. 3.

FIG. 5 assumes a case where the sensor module unit 120 of the collection terminal 10 determines the direction of the collection terminal 10 using the image information of a camera at step S2220.

It is determined whether, at a specific Point Of Interest (POI) displayed on a screen, a variation in an image frame that is equal to or greater than a predetermined value has appeared at step S2222. For example, when a collector walks on a specific road at a uniform speed, specific objects on the screen will be consistently moved on an image frame at a level corresponding to the walking speed.

If, at the POI displayed on the screen, the variation in the image frame is maintained at less than a predetermined value ("No" at step S2222), it is determined that the collection terminal 10 desirably tracks the collection route, and then the collection route is maintained without change at step S2226.

If at the POI displayed on the screen, the variation in the image frame is equal to or greater than the predetermined value ("Yes" at step S2222), it is determined that the directions of the collection terminal 10 and the collection route are not identical to each other at step S2224. For example, when turning at a forked road, specific objects on the screen may disappear while rotating rapidly, or new objects may appear on the screen. The rotating direction of the collection terminal 10 can be determined using the speed of the variation in the image frame depending on the time of the specific objects on the screen.

If the variation in the image frame at the specific POI displayed on the screen is equal to or greater than the predetermined value, but the directions of the collection terminal 10 and the collection route are identical to each other, the collection route is maintained without change, similar to step S2226. This case may indicate that the walking speed of the collector gradually increases, but the movement direction of the collector is identical to that of the collection route.

In contrast, if it is determined at step S2224 that the directions of the collection terminal 10 and the collection route are not identical, the collection route is re-set to a collection route most approximate to the current location and direction of the collection terminal 10 at step S2228. Upon re-setting the collection route, it must be re-set in consideration of all points ranging from the current revised location to the collection end point.

According to the present invention having the above configuration, collection points from which wireless communication infrastructure measurement information is to be collected can be automatically generated using information measured by sensors included in a terminal and indoor space information (indoor map and network model) without requiring a user's input. Accordingly, collection time relative to a collection area can be shortened, and thus the productivity of collection subjects can be improved. The automatic generation of such collection points can prevent a problem in which an error in the determination of collection points increases in a conventional scheme, that is, a scheme in which the collector personally selected collection points according to his or her subjective determination.

When collection start and end points are set in a first visited area without the understanding of a collection target area, a collection route is automatically generated. Further, when a user moves while viewing the collection route, collection points are automatically determined at designated collection periods.

Since the estimation of the collection points is implemented using a method of measuring a stride and the number of steps using information obtained by sensors (an accelerometer, a geomagnetic sensor, a gyro sensor, an altimeter, a camera, etc.) provided in the terminal, and matching the measured information with a network model (nodes and links) on an indoor map, the collector can continuously measure the location of the collection terminal without requiring a separate positioning device.

Further, the present invention is configured to, if the collector deviates from a preset collection route, determine such a deviation and generate a new collection route. By way of this function, in a situation in which collection is impossible due to unexpected construction or limited access in a collection environment, a collection route can be actively changed, thus enabling information to be promptly and accurately collected.

Consequently, the present invention not only overcomes the limitation of a conventional passive scheme in which a collector selects collection points for respective collection areas and collects measured information, but also solves the problem of causing an increase in cost attributable to an increase in the time required by the collector to collect information.

Further, the present invention can be implemented as computer-readable code in a computer-readable storage medium. The computer-readable storage medium includes all types of storage devices in which data readable by a computer system is stored. Examples of the computer-readable storage medium includes Read Only Memory (ROM), Random Access Memory (RAM), Compact Disc ROM (CD-ROM), magnetic tape, a floppy disc, an optical data storage device, etc., and also includes the form of carrier waves (for example, transmission over the Internet). Furthermore, the computer-readable storage medium can be distributed to computer systems connected over a network and computer-readable code can be stored and executed in a distributed manner.

Although the preferred embodiments of the present invention have been disclosed for illustrative purposes, those skilled in the art will appreciate that various modifications, additions and substitutions are possible, without departing from the scope and spirit of the invention. Therefore, the technical scope of the present invention should be defined by the technical spirit of the claims.

What is claimed is:

1. An apparatus for determining indoor collection points and collecting heterogeneous infrastructure measurement information, comprising:
   a sensor module unit for sensing a motion and a location;
   an indoor map database (DB) including attribute information of an indoor space and an indoor map;
   a collection route generation unit for generating a collection route on the indoor map depending on collection conditions;
   a collection point determination unit for determining a collection point from which the heterogeneous infrastructure measurement information is to be collected on the collection route while moving, based on information of the sensor module unit and the indoor map DB;
   a heterogeneous infrastructure measurement information collection unit for collecting heterogeneous infrastructure measurement information from the collection point; and
   an information combination unit for generating results of the collection by combining location information of the collection point with the heterogeneous infrastructure measurement information at the collection point.

2. The apparatus of claim 1, wherein the sensor module unit comprises one or more of an acceleration sensor, a geomagnetic sensor, a gyro sensor, an altimeter, and a camera.

3. The apparatus of claim 1, wherein the collection route comprises a collection start point and a collection end point.

4. The apparatus of claim 3, wherein the collection route further comprises an intermediate point.

5. The apparatus of claim 1, wherein the heterogeneous infrastructure measurement information comprises measurement information for positioning.

6. The apparatus of claim 1, wherein the collection point determination unit determines a movement direction and a variation in the collection point of the apparatus based on sensing information output from the sensor module unit, and determines a collection point subsequent to a current collection point mapped to the collection route using the movement direction and the collection point variation.

7. The apparatus of claim 1, wherein the collection point determination unit further comprises a route tracking unit for checking whether the determined collection point has correctly tracked the collection route.

8. The apparatus of claim 7, wherein the collection point determination unit re-sets the collection route if the determined collection point has deviated from the collection route.

9. The apparatus of claim 1, further comprising an information transmission unit for transmitting the results of the collection obtained by the information combination unit to a server.

10. The apparatus of claim 1, further comprising a combined information database for storing the results of the collection obtained by the information combination unit.

11. A method of determining indoor collection points and collecting heterogeneous infrastructure measurement information, comprising:
    generating, by a collection route generation unit, a collection route on an indoor map of a target area in which heterogeneous infrastructure measurement information is to be collected, depending on collection conditions;
    determining, by a collection point determination unit, a collection point from which the heterogeneous infrastructure measurement information is to be collected on the collection route while moving;
    collecting, by a heterogeneous infrastructure measurement information collection unit, heterogeneous infrastructure measurement information from the collection point; and
    generating, by an information combination unit, results of the collection by combining location information of the collection point with the heterogeneous infrastructure measurement information at the collection point.

12. The method of claim 11, wherein the collection route comprises a collection start point and a collection end point.

13. The method of claim 12, wherein the collection route further comprises an intermediate point.

14. The method of claim 11, wherein the heterogeneous infrastructure measurement information comprises measurement information for positioning.

15. The method of claim 11, wherein determining the collection point comprises:
    determining a movement direction and a variation in a collection point based on sensing information output from a sensor module unit; and
    determining a collection point subsequent to a current collection point mapped to the collection route using the movement direction and the collection point variation.

16. The method of claim 11, further comprising:
    checking, by the collection point determination unit, whether the determined collection point has correctly tracked the collection route.

17. The method of claim 16, wherein checking whether the determined collection point has correctly tracked the collection route is configured to re-set the collection route if the determined collection point has deviated from the collection route.

18. The method of claim 11, further comprising:
storing, by the information combination unit, the results of the collection in a combined information database.

19. The method of claim 11, further comprising:
transmitting, by an information transmission unit, the results of the collection to a server.

* * * * *